United States Patent
Little et al.

(10) Patent No.: US 10,505,629 B2
(45) Date of Patent: Dec. 10, 2019

(54) VISIBLE-LIGHT COMMUNICATIONS RECEIVER

(71) Applicant: Trustees of Boston University, Boston, MA (US)

(72) Inventors: Thomas DC Little, Newton, MA (US); Jimmy Chau, Allston, MA (US)

(73) Assignee: Trustees of Boston University, Boston, MA (US)

(*) Notice: Subject to any disclaimer, the term of this patent is extended or adjusted under 35 U.S.C. 154(b) by 0 days.

(21) Appl. No.: 15/758,844

(22) PCT Filed: Oct. 14, 2016

(86) PCT No.: PCT/US2016/057053
§ 371 (c)(1),
(2) Date: Mar. 9, 2018

(87) PCT Pub. No.: WO2017/123297
PCT Pub. Date: Jul. 20, 2017

(65) Prior Publication Data
US 2019/0165859 A1     May 30, 2019

Related U.S. Application Data

(60) Provisional application No. 62/242,435, filed on Oct. 16, 2015.

(51) Int. Cl.
*H04B 10/516* (2013.01)
*H04B 10/116* (2013.01)
(Continued)

(52) U.S. Cl.
CPC ......... *H04B 10/116* (2013.01); *G08C 23/04* (2013.01); *H04B 10/516* (2013.01); *H04B 10/61* (2013.01)

(58) Field of Classification Search
CPC combination set(s) only.
See application file for complete search history.

(56) References Cited

U.S. PATENT DOCUMENTS 6,668,108 B1   12/2003   Helkey et al.
6,819,469 B1   11/2004   Koba
(Continued)

OTHER PUBLICATIONS

George S. D. Gordon, Feasibility Demonstration of a Mode-Division Multiplexed MIMO-Enabled Radio-Over-Fiber Distributed Antenna System, Journal of Lightwave Technology, vol. 32, No. 20, Oct. 15, 2014, pp. 3521-3525.*
(Continued)

*Primary Examiner* — Omar S Ismail
(74) *Attorney, Agent, or Firm* — BainwoodHuang

(57) ABSTRACT

An optical wireless communications receiver includes a set of photodetectors and signal processing circuitry that receive and process optical communications signals to generate receive data. The receiver includes a spatial light modulator (SLM) and associated SLM controller. The SLM receives an incident optical communications signals from remote optical transmitters and selectively directs the received optical communications signals to the photodetectors to realize an SLM pattern according to SLM control signals from the SLM controller. A system controller establishes the SLM pattern and communicates a description of it to the SLM controller for use in generating the SLM control signals. The receiver may be used in a variety of applications, including so-called visible-light communications or VLC, in which data is transmitted over an optical link using light in the visible spectrum.

17 Claims, 3 Drawing Sheets

(51) Int. Cl.
*H04B 10/61* (2013.01)
*G08C 23/04* (2006.01)

(56) References Cited

U.S. PATENT DOCUMENTS

| | | | |
|---|---|---|---|
| 7,136,587 B1 | 11/2006 | Davis et al. | |
| 7,217,911 B2 | 5/2007 | Edwards et al. | |
| 7,277,173 B1 | 10/2007 | Bock et al. | |
| 7,327,914 B1* | 2/2008 | Kahn | G02B 6/4206 385/15 |
| 8,427,657 B2 | 4/2013 | Milanovic | |
| 8,611,758 B2 | 12/2013 | Kuo et al. | |
| 2004/0161246 A1 | 8/2004 | Matsushita et al. | |
| 2004/0218172 A1 | 11/2004 | Deverse et al. | |
| 2005/0205756 A1* | 9/2005 | Edwards | H04B 10/114 250/208.1 |
| 2008/0212980 A1 | 9/2008 | Weiner | |
| 2009/0002265 A1* | 1/2009 | Kitaoka | G09G 3/003 345/4 |
| 2009/0283679 A1* | 11/2009 | Murayama | H01L 31/0203 250/338.1 |
| 2013/0236195 A1* | 9/2013 | Ryf | H04B 10/615 398/208 |
| 2014/0029951 A1 | 1/2014 | Handelman | |
| 2014/0072119 A1 | 3/2014 | Hranilovic et al. | |
| 2015/0286340 A1* | 10/2015 | Send | G01S 17/46 345/175 |

OTHER PUBLICATIONS

A.E. Willner, Optical communications using orbital angular momentum beams, Advances in Optics and Photonics 7, 66-106 (2015), pp. 71,75,76 and 81.*
Jimmy C. Chau, International Conference on Embedded Wireless Systems and Networks (EWSN) , Feb. 15-17, 2016, pp. 348-351.*
Weiqing Pan,Wireless optical communication-based spatial pattern,Science Direct, Optik 118(2007)-13-18 , pp. 14-16.*

* cited by examiner

VISIBLE-LIGHT COMMUNICATIONS RECEIVER

STATEMENT OF GOVERNMENT RIGHTS

The invention was made with Government support under Contract No. EEC0812056 awarded by the National Science Foundation. The Government has certain rights in the invention.

BACKGROUND

The invention is related to the field of optical wireless communications and tracking of targets using optical signals. In one particular aspect, the invention is related to optical wireless communications receivers used in optical wireless communications systems.

SUMMARY

An optical wireless communications receiver is disclosed that includes a set of photodetectors and associated signal processing circuitry that receive and process optical communications signals to generate one or more streams of received data. The receiver also includes a spatial light modulator (SLM) and associated SLM controller, the spatial light modulator being configured to receive incident optical communications signals from remote optical transmitters and selectively direct the received optical communications signals to the photodetectors to realize an SLM pattern according to SLM control signals from the SLM controller. An SLM pattern is a particular configuration of the SLM (e.g., orientation of micromirrors in a micromirror array or the opacity of pixels in a LCD). A system controller controls how the SLM changes the SLM pattern. The SLM pattern is determined in part by the SLM and in part by other factors, such as the relative position of the transmitter and receiver. The controller measures the SLM pattern as is, determines how the SLM can modify the SLM pattern to achieve a desired objective, and then instructs the SLM to effect this change through the SLM controller. The receiver may be used in a variety of applications in optical communications, including infrared communications, and so-called visible-light communications or VLC, in which data is transmitted over an optical link using light in the visible spectrum.

Specific functions/advantages of the disclosed receiver can include the following:

Dynamically adjusting a communications SLM pattern defining an assignment of received optical communications signals to respective photodetectors. This capability can be used to achieve a variety of different system objectives (e.g., maximize/increase capacity, minimize/reduce interference, perform diversity combining, support mobility by tracking/following multiple transmitters).

Obtaining channel state information, such as relative location/direction of the transmitters and the gain from each transmitter to the receiver (either to each SLM pixel or to each photodetector). This information can be used:

as input to dynamically adjust the communications SLM pattern to determine the relative location of the receiver with respect to the transmitters (or vice versa) for the purpose of localization, positioning, and navigation In some embodiments, providing camera-like functionality for capturing still images (photographs) or moving images (videos). That is, the same device may be used for both visible-light communications (VLC) and photography. Multiple such receivers may be used together to enable a system to obtain multiple perspectives for applications such as 3D scanning or 3D image capture.

The receiver can also be used to increase the effective spatial resolution of VLC receivers (e.g., using a 1920×1080-pixel SLM, the resolution of a 2-photodetector VLC receiver can be increased to 1920×1080). The receiver can also be used, more generally, for other forms of optical wireless communications. For example, the system can be used to facilitate free-space optical communications (FSO) with multiple transmitters or to track moving transmitters for FSO.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
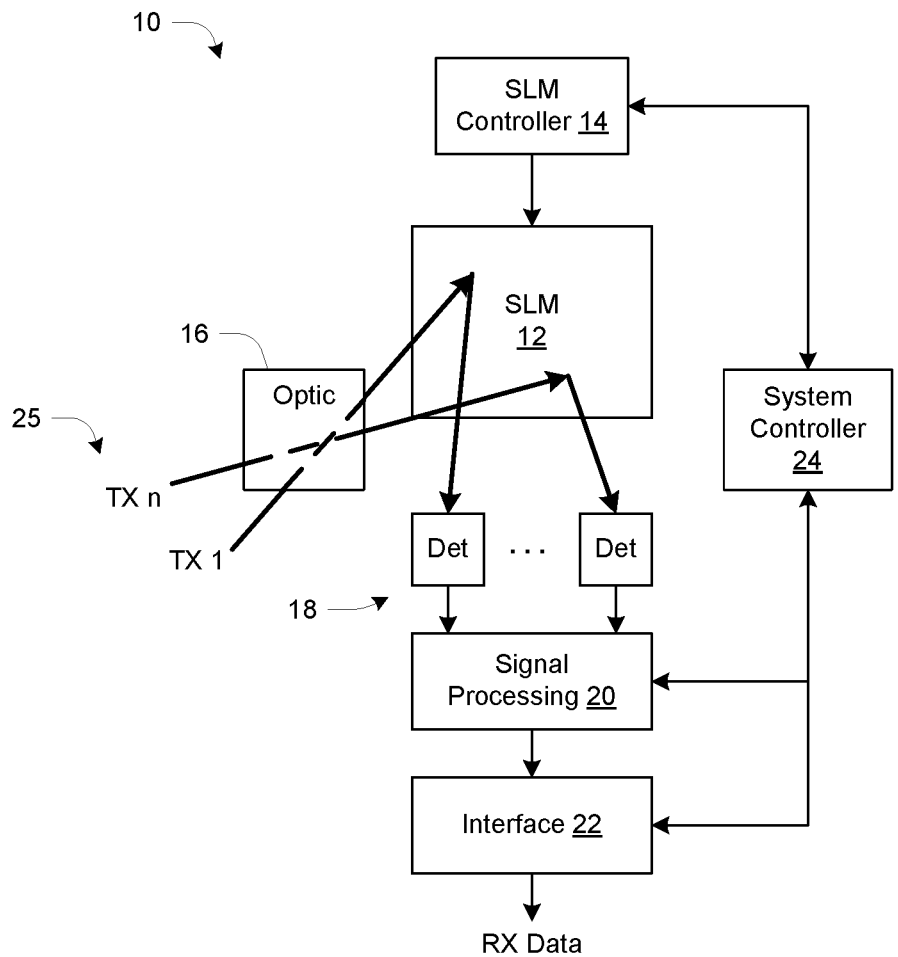
FIG. 1 is a block diagram of an optical wireless communications receiver.

FIG. 1 shows an optical wireless communications receiver 10 for use in an optical wireless communications system. The major components of the receiver 10 are a spatial light modulator (SLM) 12 and associated SLM controller 14, an imaging lens or other optic 16, a set of photodetectors (Det) 18, signal processing circuitry 20, interface circuitry 22, and a system controller 24. The photodetectors 18 may have respective associated concentrator lenses or similar optics (not shown) for collecting light. The receiver 10 receives optical communications signals 25 shown as Tx n from respective optical transmitters (not shown) located in the neighborhood of the receiver 10. In one example the transmitters are incorporated into a lighting device such as a ceiling fixture or a lamp (e.g., floor lamp or desk lamp or automotive headlamp or tail lamp). As described more below, the receiver 10 detects optical signals from the different transmitters and directs the signals to respective photodetectors 18. The signals may carry demultiplexed components of a higher-rate communications signal provided to the set of transmitters for delivery to the receiver, in which case the signal processing circuitry 20 multiplexes the lower-rate signals from the photodetectors 18 together to recover the original higher-rate signal. Other types of signal processing may be used in other applications as describe more herein.

The receiver 10 is capable of receiving signals originating from one or more optical sources. The disclosed receiver has features and advantages including:

(1) separating and aggregating signal strength from a particular source, redirecting same-source signals to a high-bandwidth photodetector;

(2) increasing flexibility in designing high-speed receiver units, allowing the fabrication of PD receivers in arbitrary form factors and spacing (varying fill factor, linear arrays, or circular arrays) which enable achieving smaller packaging with the same optics;

(3) supporting a scalable number of optical sources by scaling the number of photodetectors 18 that are employed;

(4) supporting ancillary or secondary functions, notably including imaging-camera functions by scanning or computational imaging for example; and (5) supporting signal processing using compressive sensing and multiple-input, multiple-output communications.

In many known systems, optical receivers are used to receive a single optical beam. In short-range environments such as using overhead lighting or overhead light beams there is an opportunity to increase data capacity through the use of multiple beams. Similarly, in long range applications such as vehicle to vehicle and vehicle to infrastructure, and encompassing automobiles, UAVs, bicycles, pedestrians an other mobile platforms. The disclosed approach isolates signal-originating spots in an imaged scene and maps them onto photodetectors 18 corresponding to each signal and channel. With an appropriate mapping function between the sources and receiver 10, it is possible to route and aggregate signals onto the detectors 18, using the SLM 12, in a generally arbitrary way, and serving to improve the signal strength and quality of the transmitted data. The result is scalable to more transmitters/signals by simply adding more photodetectors 18.

The imaging optic 16 projects an image of the scene onto the SLM 12, which has an array of individual beam-affecting elements referred to as "pixels" herein. In one example the SLM 12 is a MEMs mirror array in which each pixel is a respective individual mirror that can be steered by a control signal from the SLM controller 14. More generally, the SLM 12 can be any pixelated array of elements capable of directing individuated light beams to respective photodetectors 18. By adjusting the orientation of the pixels, the SLM 12 directs light that lands on the pixels toward desired photodetectors 18. Generally the SLM 12 has sufficient size and resolution to receive light from a desired number of transmitters separated by no less than a specified amount. For example, an SLM 12 may have a 4×4 array of pixels and receive light within a cone of angles, e.g., +/−45 degrees about a central axis. In this case the SLM 12 may be capable of resolving up to 16 transmitters if they are distributed evenly over the image.

The optic 16 may be realized by a non-imaging optic, such as a diffraction grating, a concentrator lens, an array of optics. Alternatively, in some embodiments the optic 16 may simply be dispensed with. However, in some applications the optical signals may be more likely to interfere with each other at the photodetectors 18 if no optic 16 is used. In case of such interference, the signal processing circuitry 20 can use multiple-input, multiple-output (MIMO) techniques, such as joint decoding or zero forcing to separate signals from different transmitters. In non-imaging embodiments, the SLM 12 may be used to adjust the communications channel to improve performance.

The role of an imaging optic 16 may also be subsumed by the SLM 12.

In one embodiment the SLM 12 is realized as an array of many tiny mirrors (e.g., a digital micro-mirror device (DMD), examples of which are discussed below. Other alternatives include:

A single larger mirror incorporating adaptive optical (AO) elements to enable its detailed shape to be altered to direct individual light beams to selected photodetectors 18 as desired;

A transmissive SLM 18 instead of a reflective one to direct light. For example, a transmissive SLM 18 may vary the refractive index of liquid crystals to direct light.

An SLM 18 that selectively passes or blocks light beams, using liquid crystals, using plasmonics, or similar approaches.

Both the optic 16 and the SLM 12 have a role in isolating the light from each optical transmitter. The optic 16 separates light coming from different locations by projecting different sections of input light onto different positions of the SLM 12. For example, light from transmitter A is projected onto location 1 of the SLM while light from transmitter B is projected onto different location 2. The SLM 12 has independent mirrors at locations 1 and 2 and thus can steer the light from transmitters A and B independently. For example, the SLM 12 can steer light from location 1 (the light from transmitter A) to photodetector #1, and steer the light from location 2 (light transmitter B) to photodetector #2. In this way, the optic 16 and the SLM 12 work together to map light from the transmitters to the photodetectors 18.

As noted, the optical receiver 10 may operate in the visible-light range. Alternatively, the receiver 10 may be used to receive infrared or ultraviolet light by selecting the appropriate optic 16, SLM 12, and photodetectors 18. For example, infrared photodetectors 18 can be used in the receiver with lenses that pass infrared light, along with an SLM 12 that can steer infrared light.

Overview of Operation

Figure 2:
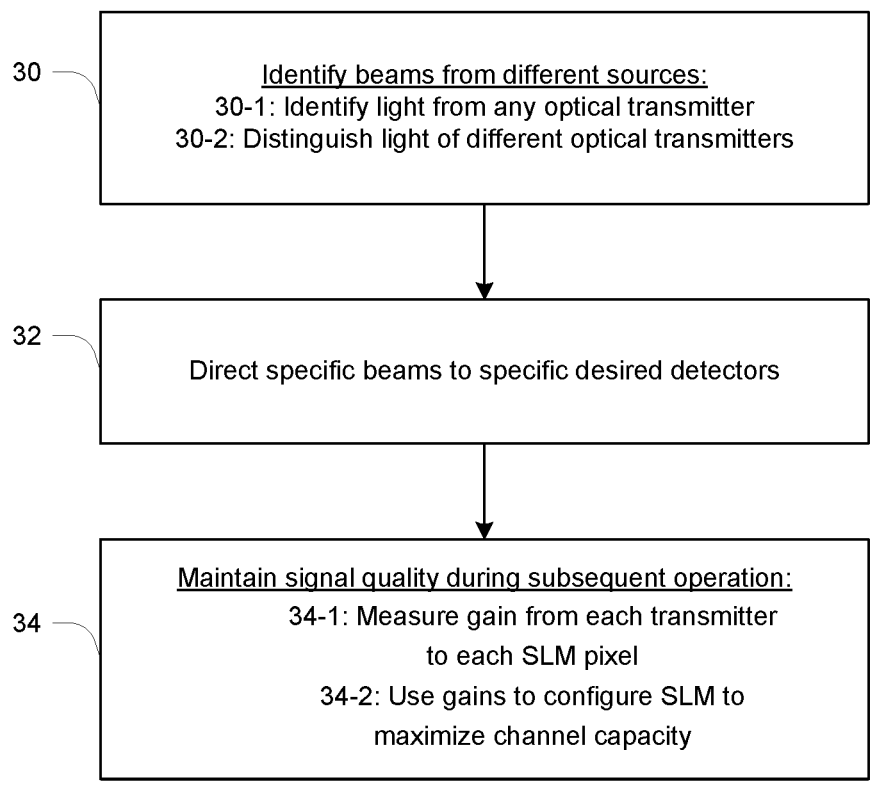
FIG. 2 is a flow diagram of high-level operation of the receiver.

Referring to FIG. 2, the following three aspects of operation are described in detail:

30—Identifying beams from different sources/transmitters

32—Directing specific beams to specific desired detectors

34—Maintaining signal quality during subsequent operation. In one example, this occurs when there is relative motion between the transmitters and receiver, i.e., either or both the transmitters or receiver are mobile.

30—Identifying Beams from Different Sources

The process of identifying light from different optical transmitters can be divided into two steps:

30-1: Identify light from any optical transmitter 30-2: Distinguish light of different optical transmitters For step 30-1 (identifying light from any optical transmitter), several methods can be used to detect optical transmissions:

a. Detect light sources b. Detect high-frequency components above a noise floor c. Detect signals conforming to a certain structure d. Attempt to decode the signal The above alternatives are specifically discussed below.

(a) Detect Light Sources

A method may be used that assumes that any light source brighter than a certain threshold is an optical transmitter. This method may work best when the only light sources are optical transmitters (e.g., in indoor scenarios where every light is also a visible light communications transmitter).

Procedure:

1. Acquire an image of the entire scene (e.g., by raster scanning the pixels of the SLM 12).

2. Compare the brightness of each pixel against a threshold brightness. Pixels that are brighter than the threshold are assumed to be receiving an optical communications signal.

(b) Detect High-Frequency Components Above a Noise Floor

This method, to detect high-frequency signal components above a noise floor, relies on the assumption that light from non-optical-communications sources tend to be steady or modulated at low frequencies (e.g., <240 Hz for televisions and displays, or <100 kHz for fluorescent lights), while in contrast the light from high-speed optical transmitters uses a much wider bandwidth of frequencies, with bandwidths extending beyond 1 MHz for example. Thus, light from optical transmitters can be determined by sampling the light to determine whether the light is modulated with any significant high-frequency component.

One procedure to determine which pixel in the array receives light from an optical transmitter is to scan the entire SLM pixel array:

1. Start with the pixel on row 1, column 1; direct the light from this pixel towards an available photodetector.
2. Dwell on this pixel long enough for the photodetector to capture the light incident on this SLM pixel as a function of time for enough samples to determine whether the high-frequency component of the received signal significantly exceeds the noise floor.
3. Redirect the light from this pixel away from the photodetector.
4. Repeat with the next un-scanned pixel until the entire array of pixels has been scanned.

If multiple photodetectors are available to do this scanning, multiple pixels can be checked in parallel (e.g., photodetector 1 dwells on pixel 1 while photodetector 2 dwells on pixel 2; then photodetector 1 can skip to pixel 3 for the next iteration.)

(c) Detect Signals Conforming to a Certain Structure

Optical signals typically have a predetermined structure, such as the frame structure of packets (e.g., pilot signal, header, data, wait), the modulation scheme (e.g., Manchester encoding), the presence of a carrier signal, an embedded squelch signal, or something else. A scanning procedure analogous to the above technique of detecting high-frequency components above a noise floor can be used to check for signals that match the known structure. As an example, an analog of step 2 is to dwell and check if the signal conforms to the known structure.

(d) Attempt to Decode the Signal

Assuming that the communications protocol includes a checksum or other error-detection mechanism, the receiver can attempt to decode the signal to determine whether a signal exists. Although this approach will likely have the lowest false-detection rate, it would likely have the highest missed-detection rate too (since a sufficient signal-to-noise ratio is needed to reliably decode transmitted optical signals).

These various approaches can be combined to improve the reliability of the optical signal detection mechanism.

Sub-step 30-2, distinguishing light of different optical transmitters, may be performed as follows:

Once the pixels that are receiving signals from any optical transmitter are identified, this set of pixels can be partitioned into subsets of pixels that receive signals from a particular optical transmitter.

To increase the signal-to-noise ratio for this step and to reduce the number of signals that need to be individually checked, adjacent pixels that receive light from any optical transmitter can be clustered together (so that they all direct their light toward the same photodetector, effectively adding their signals together).

To ensure that the receiver can distinguish between signals from different transmitters, transmitters can encode or modulate their signals with a unique identifying feature. For example, from the available bandwidth, a small band can be reserved to embed a unique identification signal that is continuously transmitted by each optical transmitter. If the identification signals are orthogonal to each other, then they can be decoded even if they interfere with each other.

Thus the process involves operations at both the transmitter and receiver. At the transmitter:

1. Assign each active transmitter a unique and orthogonal identification signal. These identification signals may be pre-assigned, or if some method of coordinating the transmitters is available (e.g., a supplementary RF communications channel), the orthogonal identification signals can be dynamically assigned. No more than one transmitter within range of any receiver should use the same identification signal.
2. Active transmitters regularly transmitting their identification signals.

And at the receiver:

1. Reading the signal received by each cluster by directing the light that lands on the cluster onto a photodetector. Multiple clusters may be checked in parallel if multiple photodetectors are available (i.e., not currently needed for some other purpose). Each cluster of pixels at the receiver receives:
   Zero identification signals if none of the pixels receive any optical communications signal;
   One identification signal if the cluster receives signals from only one transmitter and no interference from other transmitters; or
   Multiple identification signals from multiple transmitters. Since the identification signals are orthogonal, the receiver can determine exactly which transmitters are being received despite the interference between transmitters. In this case, the receiver should further partition this cluster of pixels to minimize interference between transmitters.
2. If any pixel receives light from multiple transmitters, that pixel may either be configured to discard the light, assigned to a cluster that also receives signals from those transmitters, or configured to be part of another cluster despite the interference depending on which configuration yields the best performance.
3. Clusters that receive light from the same transmitter should be treated as a single cluster of pixels, directing their light toward the same photodetector (i.e., equal gain combining) if this improves the signal-to-noise ratio.

32—Directing Specific Beams to Specific Desired Detectors

This step requires (1) a physical mechanism (i.e., SLM 12) for selectively directing incident light to different photodetectors 18, and (2) processing and signaling for establishing a desired mapping or matrix for all incident signals and communicating the mapping/matrix to the physical mechanism. These are discussed in turn.

In general, different types of SLMs 12 may be used that employ different mechanisms to redirect light. One embodiment uses a reflective SLM 12 in which each pixel is a mirror that can be angled in different directions; however, other types of SLM 12 can also be used to direct light towards or block light from reaching certain photodetectors.

The following are two specific types of reflective SLM 12 that are discussed in some detail below. These are both micromirror devices, differing primarily in the degree of adjustability of the individual mirrors:

Lambda Router (finer adjustability)
Digital light processing (DLP) device (coarser binary adjustability)
Lambda Router The Lambda Router is electrostatically controlled and has pixels consisting of flat MEMS mirrors that can be rotated about two axes across a range of angles. An invertible mapping exists between the voltage applied for each axis and the rotation about that axis, so the each Lambda Router pixel's mirror can be oriented to face the desired direction by applying the appropriate voltages.

For a Lambda Router pixel to direct light from the optic 16 to a particular photodetector 18, the pixel's mirror is oriented so that the mirror's normal vector bisects the angle at the pixel between the center of the optic 16 and the selected photodetector 18.

Since the orientation of each Lambda Router mirror can be independently controlled (i.e., they can all face the same direction, different directions, or some to one direction and others to other directions), the light incident on any Lambda Router pixel can be directed to any photodetector 18.

DLP Device

The DLP Device is also a reflective SLM. It primarily consists of a DMD (digital micro-mirror device, or a MEMS mirror array) and a controller that provides the voltages to electrostatically control DMD. Unlike the Lambda Router, each mirror of the DMD can only rotate about one axis and can be rotated to one of only two possible directions: +12 degrees and −12 degrees; these directions are called the "on" and "off" directions. The DMD may exhibit simpler control, higher resolution, and wider angular range than the Lambda Router.

In one setup, the DMD is centered on the optical axis of the optic 16, with one photodetector 18 to either side of the optical axis. The DMD is oriented so that pixels in the "on" direction direct light from the optic 16 towards one photodetector, and pixels in the "off" direction direct light from the optic 16 towards the other photodetector.

Through a DLP controller, the angular position of each pixel can be controlled by sending a black-and-white image with appropriate resolution (the same resolution as the DMD, e.g., 1920×1080). Each pixel of the black-and-white image corresponds to a pixel of the DMD. In one realization, "white" pixels have mirrors positioned in one direction and "black" pixels have mirrors positioned in another direction.

Such an arrangement can track and receive optical signals from up to two transmitters (since each mirror can be configured to take one of only two possible positions). A receiver 10 using a Lambda-Router-based SLM 12 can be configure to point in many more directions, and can thus be used to track and receive from more transmitters.

Using the procedure of 30 outlined above (Identify beams from different sources), the pixels that receive light from the first transmitter can be configured to the "on" position, while the pixels that receive light from the second transmitter can be configured to the "off" position. Pixels that receive light from neither or both can be configured to either position, as appropriate to optimize the system's performance.

If more photodetectors are available than the number of transmitters, extra photodetectors may be used to:
Receive from pixels that receive interfering signals from multiple transmitters;
Scan pixels that did not receive signals from any transmitters to find new transmitters;
Scan pixels adjacent to the pixels currently receiving optical signals from transmitters (to detect movement of the transmitters relative to the receiver).
Provide additional functionality, such capturing an image of the scene.

Figure 3:
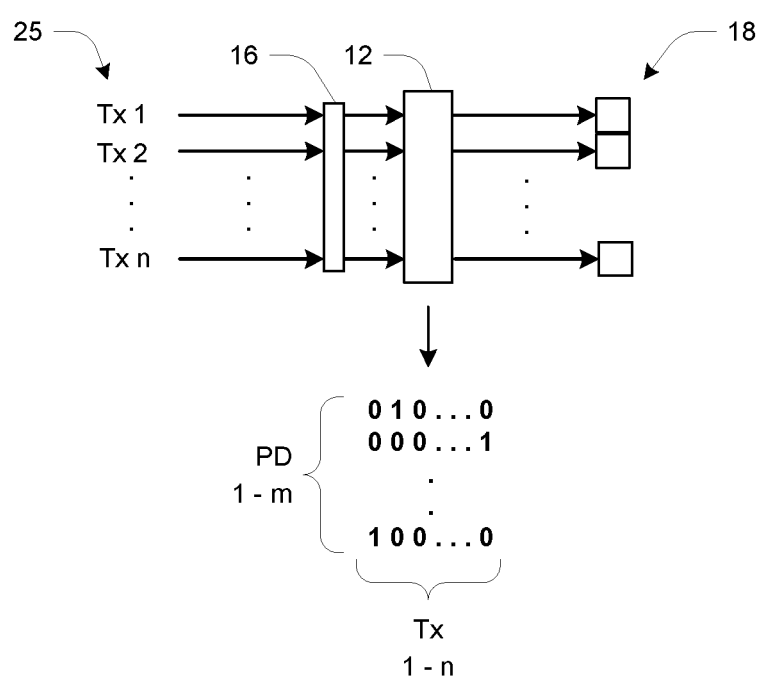
FIG. 3 is a schematic diagram of the use of an SLM in realizing an SLM pattern.

FIG. 3 illustrates establishing a mapping or matrix, referred to as an SLM pattern, realized by the SLM 12 for directing incident signals 25 to the photodetectors 18. Conceptually the mapping/matrix is two-dimensional, specifying for each signal Tx n a corresponding photodetector 18 to which that signal is to be directed. This is shown as a two-dimensional matrix of binary values 0/1, with each row representing a photodetector 18 and each column representing a signal Tx n. The "1" values represent the assignment of the corresponding signal Tx n to a corresponding photodetector. For example, for the first row having the values {0, 1, 0, . . . 0} as shown, the "1" in the second position indicates that the signal Tx 2 is directed to photodetector #1. It will be appreciated that there are corresponding real control values applied to the SLM 12 to implement such a matrix. Referring again to example of row 1, the system controller 24 and SLM controller 14 will have determined the pixel(s) at which the signal Tx 2 is incident, and a control value is supplied for this pixel to cause the incident signal Tx 2 to be directed to photodetector #1. The control value may represent an angle or angles of pixel mirror(s) as described above, a position of a pixel shutter (e.g., on/off), or some other physical characteristic of a pixel mechanism to direct Tx 2 in the desired manner.

34—Maintaining Signal Quality During Subsequent Operation (e.g., Transmitters or Receiver Mobile)

Another aspect of operation is to maintain signal quality, especially in an application in which the transmitters or receiver is/are mobile. This is done by:
Ensuring that light from transmitters within the field-of-view is detected by a photodetector to maximize the signal power received;
Minimizing interference between signals from independent transmitters within the field-of-view; and
Rejecting ambient/background light to reduce shot noise.

The mechanism for achieving these objectives can be split into two parts, which are described below:
34-1: Measure the gain from each transmitter to each pixel of the SLM.
34-2: Use the measured gains for each transmitter to each SLM pixel to configure the SLM to (roughly) improve the channel capacity from the transmitters to the receiver.

34-1. Measure the Gain from Each Transmitter to Each Pixel of the SLM

Different techniques such as scanning and selectively using pixels can be used for measuring the gain:

A. By scanning

The gains from each transmitter to each pixel of the SLM can initially be measured using the scanning procedure described in "Identify beams from different sources". Assuming that active transmitters continuously transmit their unique and orthogonal identification signal, and assuming that the transmit power of each active transmitter's identification signal is known, for a given SLM pixel, the gain from each transmitter to that pixel can be determined by the following procedure:

1. Configure the pixel to direct light towards an available photodetector.
2. Use the photodetector to capture the optical signal incident on the photodetector as a function of time for long enough to reliably perform the next step.
3. Isolate the continuously transmitted identification signal(s) received, if any. If identification signals from multiple transmitters are received, separate the signals by transmitter (this can be done since each of the unique identification signals are orthogonal). Measure the power of each identification signal. The ratio of the received identification signal power to the transmitted identification signal power is the channel gain from the transmitter (to which the identification signal belongs) to the SLM pixel. This gain also includes any attenuation from the SLM pixel to the photodetector, but that's okay.

If some photodetectors are in use to receive data transmissions from optical transmitters, fewer photodetectors may be available to scan the entire SLM pixel array to measure the gain from the transmitters to each SLM pixel. In this case, we may restrict scanning to the pixels where we anticipate signals from optical transmitters may appear:

The pixels along the edges of the SLM for transmitters entering the SLM camera/receiver's field of view.

The pixels adjacent to pixels already receiving signals from optical transmitters. This would detect if the transmitter moves so that adjacent pixels also receive signals from the transmitter.

Occasionally scan other pixels in the array (in case an inactive optical transmitter turns on), but do so less frequently. Newly appearing optical transmitters may also be able to communicate its presence to the SLM camera/receiver to trigger a search for the new optical transmitter. This communications can be done via:

A supplementary (e.g., RF) communications channel;

One of the other established optical communications channels;

An optical signal from the new optical transmitter directly to the SLM camera/receiver if every pixel is currently configured to direct light towards a photodetector (In the DLP-based implementation, the DMD mirrors always point towards either one photodetector or the other (except during transitions). This means that at any optical signal from a transmitter within the field of view would be captured by a photodetector. This optical signal may just be the new transmitter's orthogonal identification signal to minimize interference.);

Or via any other established communications channel.

B. By temporarily directing light from a pixel toward a photodetector that's already in use If no (or very few) spare photodetectors are available in the SLM camera/receiver to scan for new transmitters, the transmitter-to-pixel gain of idle pixels (those not currently receiving signals from active optical transmitters) can still be measured by temporarily configuring the pixel to direct its light towards any of the photodetectors already in use. The transmitter-to-pixel gains of the temporarily added pixel equals the difference in transmitter-to-photodetector gains before and while the pixel's light is temporarily directed towards the photodetector (this gain includes the gain or attenuation from the pixel to the photodetector, but that can be ignored). Although doing this may add interference to the selected photodetector, this interference is small (assuming that light from most optical transmitters is spread over multiple SLM pixels) and temporary. One of the following techniques may be used:

C. By Measuring the Gain of a Pixel That's Already Receiving Optical Transmissions In order to measure the transmitter-to-pixel gains for a pixel that's already directing its light towards a photodetector, temporarily direct its light away from the photodetector and measure the difference in the identification signal power from each transmitter to that photodetector. This is useful to determine whether A transmitter moved and its light no longer reaches the pixel in question.

Another transmitter moved and its light now interferes with the transmissions that the pixel or photodetector was already receiving.

This temporary change can temporarily decrease the transmitter-to-photodetector gain for that photodetector, but this loss is brief and its negative effect should be small.

The above two methods ("By temporarily directing light from a pixel toward a photodetector that's already in use" and "Measure the gain of a pixel that's already receiving optical transmissions") enable the SLM camera/receiver to continue to update its transmitter-to-pixel gain measurements even when all of the photodetectors are already in use.

If additional information about the movement of the transmitters and the receiver relative to each other is available (e.g., through inertial measurement units such as gyroscopes and accelerometers or through other location tracking systems), this information can be used to prioritize which pixels need to be re-checked to update the transmitter-to-pixel gain measurement.

34-2. Configuring the SLM to Improve the Channel Capacity from the Transmitters to the Receiver Once the gain from each transmitter to each SLM pixel is known, software algorithms can be used to calculate SLM configurations that will maximize transmitter-to-photodetector gains while minimizing interference between signals from different transmitters.

For example, a preliminary algorithm may be:

1. Group together any pixels that only receive signals from one optical transmitter so that they would all point toward the same photodetector (if any photodetector).

2. For each group of pixels, calculate the aggregate transmitter-to-pixel-group gain by adding together the transmitter-to-pixel gain of each pixel in the group.

3. If the number of groups is less than or equal the number of available photodetectors, then assign each of the groups to a different photodetector. Otherwise, given M photodetectors, a. Configure the M pixel groups with the greatest transmitter-to-pixel-group gain to each direct their light to a different photodetector.

b. If the remaining transmitters would otherwise be unused, and if the transmitters are capable of doing so, configure the remaining transmitters to each transmit a synchronized copy of one of the M signals received in step 3a. Thus, these remaining transmitters can be included into the M pixel groups to add to the received signal strength.

4. If all SLM pixels must direct their light toward a photodetector (i.e., there is no SLM pixel configuration in which the light incident on the pixel is directed away from all photodetectors), then either:

a. Configure all idle pixels to direct light towards an idle/available photodetector, or b. Configure idle pixels to direct light toward the same photodetector as the nearest active pixel; this may facilitate mobility.

Depending on the design of the receiver, it may be possible for pixels to point away from any photodetector so that no photodetector receives light incident on the pixel. In other implementations, all light incident on a SLM pixel is directed towards the photodetectors It should be noted that the above presents one simplified or heuristic strategy to increase channel capacity. In some cases (e.g., when the signal strength is weak), better communications capacity may be achieved by combining some of the signals rather than separating them.

As mentioned above, the optical communications signals may carry demultiplexed components of a higher-rate communications signal provided to the set of transmitters for delivery to the receiver, in which case the signal processing circuitry 20 multiplexes the lower-rate signals from the photodetectors 18 together to recover the original higher-rate signal. Such a spatial multiplexing scheme is one example of a broader class of multiple-input, multiple-output (MIMO) encoding techniques that may be realized using the disclosed receiver. For example, there may be joint MIMO encoding/decoding schemes that can be used to increase the overall capacity that do not strictly involve multiplexing/demultiplexing.

While various embodiments of the invention have been particularly shown and described, it will be understood by those skilled in the art that various changes in form and details may be made therein without departing from the scope of the invention as defined by the appended claims.

What is claimed is:

1. An optical wireless communications receiver, comprising:
    a set of photodetectors and associated signal processing circuitry collectively operative to receive and process communications signals to generate one or more streams of receive data;
    a spatial light modulator and associated SLM controller, the spatial light modulator being configured to receive a plurality of incident optical communications signals from remote optical transmitters and to selectively direct the received optical communications signals to the photodetectors to realize an SLM pattern according to SLM control signals from the SLM controller; and
    a system controller operative to control how the SLM changes the SLM pattern and communicate a description thereof to the SLM controller for use in generating the SLM control signals.

2. The optical wireless communications receiver of claim 1, further including an imaging optic located in front of the spatial light modulator to generate an image of a scene including the incident optical communications signals at the spatial light modulator.

3. The optical wireless communications receiver of claim 1, wherein the photodetectors are visible-light photodetectors, the incident optical communications signals are visible-light optical communications signals, and the spatial light modulator is a visible-light spatial light modulator.

4. The optical wireless communications receiver of claim 1, selectively operable in two distinct modes, a first mode being a receiver mode in which the signal processing circuitry processes output signals from the photodetectors to recover communications content therefrom, a second mode being an imaging mode in which the signal processing circuitry processes the output signals from the photodetectors to recover image content therefrom.

5. The optical wireless communications receiver of claim 1, wherein the photodetectors are infrared photodetectors, the incident optical communications signals are infrared optical communications signals, and the spatial light modulator is an infrared spatial light modulator.

6. The optical wireless communications receiver of claim 1, wherein the optical communications signals carry demultiplexed components of a higher-rate communications signal provided to the remote optical transmitters as a set for delivery to the receiver, and wherein the signal processing circuitry multiplexes lower-rate signals from the photodetectors together to recover the higher-rate communications signal.

7. The optical wireless communications receiver of claim 1, wherein the system controller establishes the SLM pattern to perform diversity combining of selected optical communications receivers.

8. The optical wireless communications receiver of claim 1, wherein the system controller establishes the SLM pattern to support mobility by tracking/following positional changes in the optical communications signals.

9. The optical wireless communications receiver of claim 1, wherein the spatial light modulator is reflective.

10. The optical wireless communications receiver of claim 9, wherein the spatial light modulator employs an array of mirrors each used to direct a respective individual optical communications signal to a respective selected photodetector.

11. The optical wireless communications receiver of claim 9, wherein the spatial light modulator employs one mirror and adaptive optics to enable a detailed shape of the mirror to be altered to direct individual optical communications signals to selected photodetectors.

12. The optical wireless communications receiver of claim 1, wherein the spatial light modulator is transmissive.

13. The optical wireless communications receiver of claim 12, wherein the spatial light modulator includes an array of liquid crystal elements to selectively direct the optical communications signals to the photodetectors.

14. The optical wireless communications receiver of claim 12, wherein the spatial light modulator includes an array of shutter elements to selectively block the optical communications signals or pass the optical communications signals to respective photodetectors.

15. The optical wireless communications receiver of claim 1, wherein the system controller and signal processing circuitry are co-operative to perform sequential steps of (1) identifying optical communications signal from different sources/transmitters, (2) directing specific optical communications signals to specific desired photodetectors, and (3) maintaining signal quality during subsequent operation.

16. The optical wireless communications receiver of claim 15, wherein the system controller and signal processing circuitry are co-operative, when identifying optical communications signal from different sources/transmitters, to (1) identify light from any optical transmitter, and (2) distinguish light from different optical transmitters.

17. The optical wireless communications receiver of claim 15, wherein the system controller and signal processing circuitry are co-operative, when distinguishing light from different optical transmitters, to (1) measure the gain from each transmitter to each pixel of the spatial light modulator, and (2) use the measured gains for each transmitter to each pixel to configure the spatial light modulator to improve channel capacity from the transmitters to the receiver.

* * * * *